May 18, 1926.
T. BELANGER
POTATO PICKER AND GRADER
Filed August 5, 1925
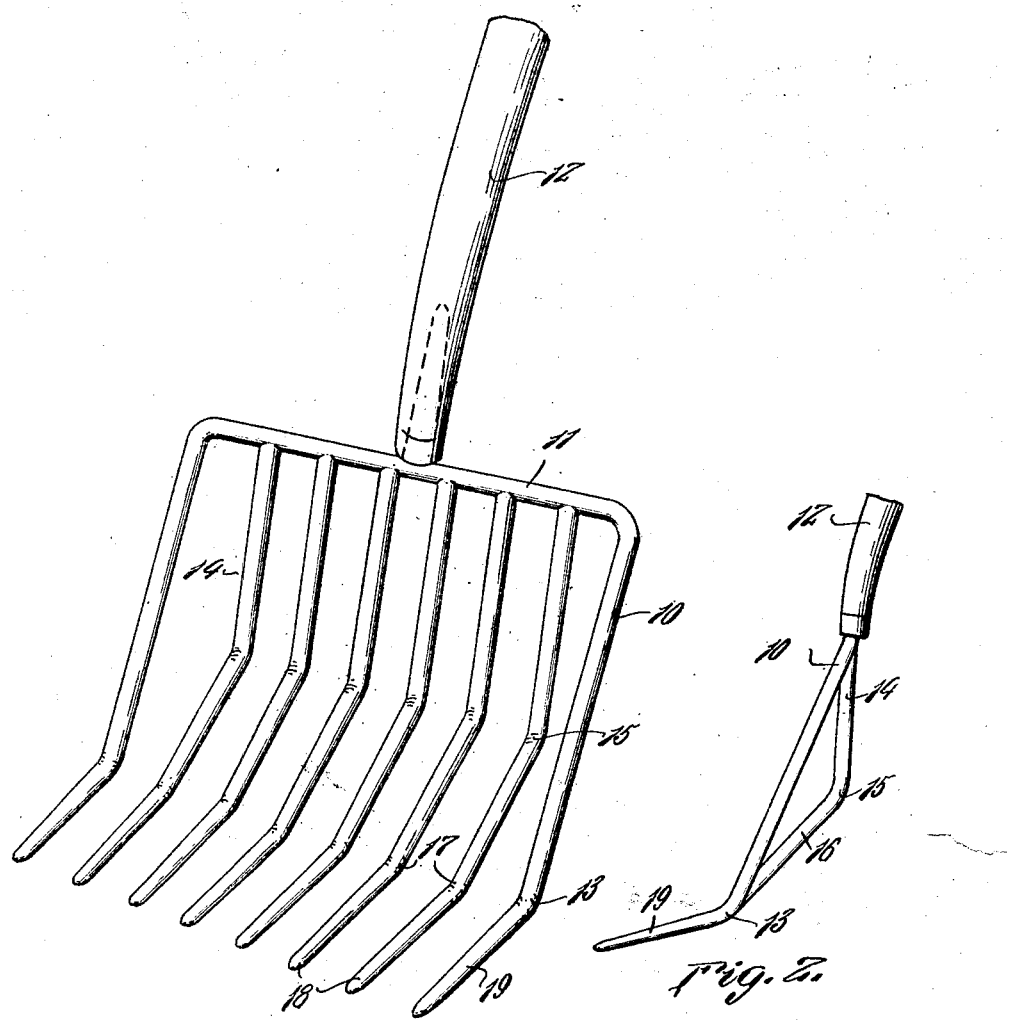
Theodore Belanger
INVENTOR
BY Victor J. Evans
ATTORNEY
WITNESS:

Patented May 18, 1926.

1,585,527

UNITED STATES PATENT OFFICE.

THEODORE BELANGER, OF PROVEMONT, MICHIGAN.

POTATO PICKER AND GRADER.

Application filed August 5, 1925. Serial No. 48,330.

It is the purpose of this invention to provide what I term a potato picker and shaker, by means of which the potatoes in large quantities can be lifted from the ground without the necessity of the user stooping or bending his back, and the potato subsequently shaken to relieve them of dirt and other foreign matter prior to depositing the potatoes in a wagon or some suitable receptacle.

In carrying out the invention I contemplate the provision of an implement including a guard frame carried by one end of a handle, the frame supporting a plurality of spaced parallel tines, all of which are peculiarly shaped to form with the side members of the guard frame what may be termed a pocket to receive and hold the potatoes, and to prevent their separation from the implement while the potatoes are being shaken for the purpose above mentioned.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a perspective view.

Figure 2 is a side elevation showing the handle broken off.

The implement forming the subject matter of the present invention embodies a substantially U-shaped guard frame, the parallel sides of which are indicated at 10 and the cross piece at 11. The guard frame is supported by one end of a handle 12 the latter being of a sufficient length to allow the implement to be used without the necessity of the user stooping down or bending his back. The handle 12 is connected with the cross piece 11 centrally thereof as shown. It will be also noted from an inspection of Figure 2 that the guard frame projects forwardly at an angle from the lower end of the handle 12, and that each of the parallel members 10 are bent at the point 13, allowing the free ends of these parallel members to rise at approximately 15 degrees for a purpose to be hereinafter described.

Carried by the guard frame is a plurality of spaced parallel tines, all of which are supported from the cross member 11, and of a peculiar configuration, so that they occupy positions with relation to the guard frame to render the implement particularly advantageous for the purpose for which it is intended. In other words, the upper portion 14 of each tine projects downwardly from the cross member 11 of the guard frame, to occupy a position at the rear of said frame as shown in Figure 2, and this portion while it may vary in length, is preferably about five inches in length. The tine is bent at the point 15, which is slightly above the transverse center of the tine, the lower portion thereof indicated at 16 being extended in the direction of the guard frame at an angle of about 45 degrees, and also approximately five inches in length. This substantially V-shaped formation of all of the tines form with the parallel side members 10 of the guard frame a pocket adapted to receive the potatoes and prevent them from separating themselves from the implement while the latter is being shaken to separate the dirt and other foreign matter from the potatoes as will be readily understood. The lower portion 16 of each tine is bent at the point 17 which is arranged to lie in the same plane with the bend 13 of the parallel members of the guard frame, the free extremities 18 of each tine being arranged to lie in the same plane with the corresponding extremities 19 of said parallel side members. Consequently the extremities 19 of the guard frame, and the extremities 18 of the tines have approximately a 15 degree raise, so that they all lie at the proper angle with relation to the ground when the implement is being used to enable the tine to slip beneath the potatoes without sticking into the potatoes or running the tines into the ground.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

A potato picker including a handle, a U-shaped guard frame supported at one end of the handle, the sides of said frame having their extremities disposed at oblique angles to said sides, a plurality of spaced parallel tines connected with the intermediate portion of the guard frame and having their major portions arranged rearwardly at the end of the frame, each tine being substantially V-shaped for the major portion of its length to form with the side members of the frame a pocket for the reception of potatoes lifted from the ground by the implement and the free ends of said tines being bent at an angle thereto, and arranged to lie in the same plane with the angular extremities of said frame for the purpose specified.

In testimony whereof I affix my signature.

THEO. BELANGER.